United States Patent Office 3,497,066
Patented Feb. 24, 1970

3,497,066
PLANTS FOR THE TREATMENT OF SEWAGE
Hames B. Nicol, Glasgow, Scotland, assignor to Drysdale & Company Limited, Glasgow, Scotland, a corporation of Great Britain
Filed Nov. 18, 1968, Ser. No. 776,408
Claims priority, application Great Britain, Nov. 17, 1967, 52,419/67
Int. Cl. C02c 5/02
U.S. Cl. 210—195                    7 Claims

ABSTRACT OF THE DISCLOSURE

A sewage treatment plant including a plurality of treatment compartments, and control means for controlling transfer of fluid to and from the compartments and for controlling admission of air to the compartments.

---

Figure 2:
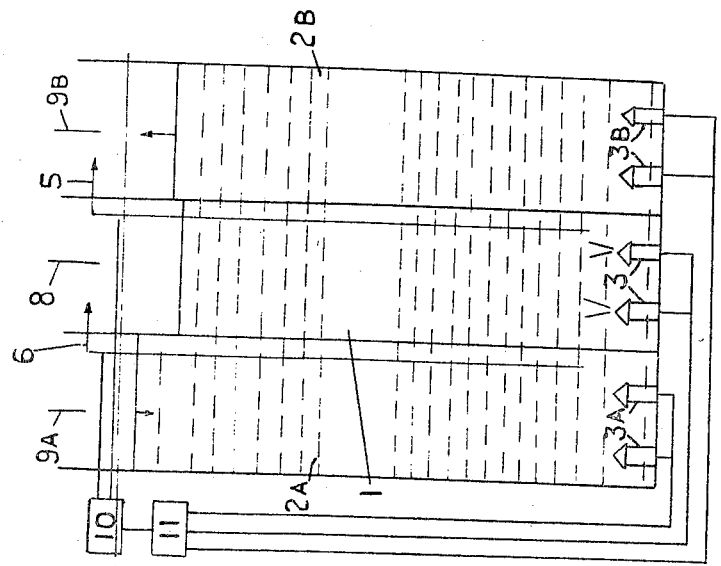

This invention relates to sewage plants and particularly to sewage treatment plants intended to employ the contact stabilization process of sewage treatment.

Sewage treatment plants operating on the contact stabilization process are already known, such plants consisting of a sewage receiving and aeration compartment, a settling compartment arranged to receive outflow from the receiving compartment and provided with a treated effluent-discharge outlet, a sludge reaeration compartment in communication with both the settling compartment and the aeration compartment and so arranged that spent sludge is transferable from the settling compartment into the reaeration compartment for reactivation and from there into the aeration compartment, and an aerobic digester compartment arranged to receive excess sludge deposited in the reaeration compartment and to treat the excess sludge to the stage where the sludge is completely inert, in which condition the sludge is disposable as an innocuous waste.

Such an existing plant is a continuous plant i.e. there is a constant intake of sewage and a constant outflow of effluent. The continuous nature of the plant causes it to be somewhat inflexible in operation since any change in the working conditions in any part of the plant is rapidly communicated to the other parts of the plant. It is an object of the present invention to provide a contact stabilization sewage treatment plant which provides a greater degree of flexibility in operation in that the working conditions in any part of the plant can be varied without changing to an appreciable extent the working conditions in other parts of the plant.

A sewage plant according to the invention incorporates three compartments, a sewage-receiving and aerating compartment and two treatment compartments, means in each compartment for introducing air at a point below the normal liquid level in the compartment, fluid transfer means for transferring fluid between the sewage-receiving compartment and each treatment compartment, the intake of each fluid transfer means being at a level lower than the level of its outlet, discharge means in each treatment compartment in the upper portion of the compartment for discharging treated sewage, fluid transfer control means arranged to control operation of the fluid transfer means in such wise that during operation of the plant the fluid transfer means is operative to provide alternately two settings of the fluid transfer means, one setting providing for the transfer of fluid from the receiving compartment to one of the treatment compartments and at the same time for the transfer of fluid from the other treatment compartment to the receiving compartment, and the other setting providing for the transfer of fluid to said other treatment compartment and at the same time for the transfer of fluid from said one treatment compartment to the receiving compartment, and air control means operative to control the air introducing means to admit aerating air continuously during operation of the plant to the sewage-receiving compartment but to admit air alternately to one or other selected treatment compartment, the selected treatment compartmen being that in which the liquid level is dropping because of transfer of fluid to the sewage-receiving compartment by the fluid transfer means.

Conveniently the plant is arranged with the receiving compartment as a central compartment with the two treatment compartments surrounding the receiving compartment. Alternatively the three compartments may be arranged in side by side formation with the receiving compartment between the two treatment compartments.

The means for transferring fluid from one compartment to another may be airlift means.

The discharge means from the treatment compartments may be weirs over which the treated sewage flows when the level rises to the appropriate height.

An extra compartment for digestion of sludge may be incorporated in the plant, said sludge-digesting compartment being connectible in both treatment compartments by fluid transfer means and being equipped with aerating means. The sludge-digesting compartment may be provided with an overflow opening leading into the sewage receiving compartment.

Figure 5:
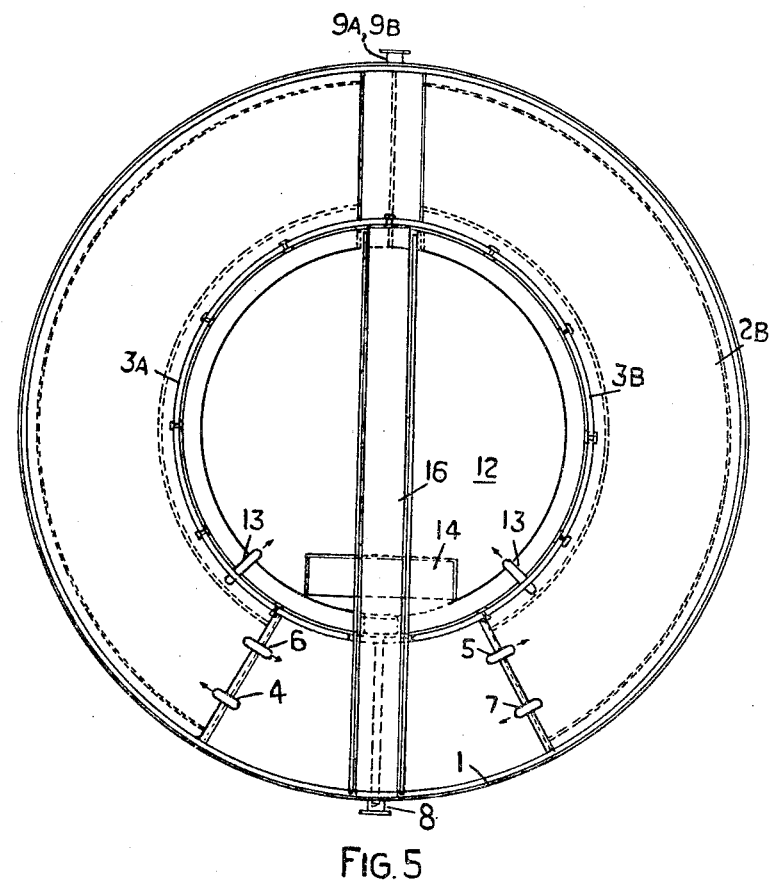
Figure 6:
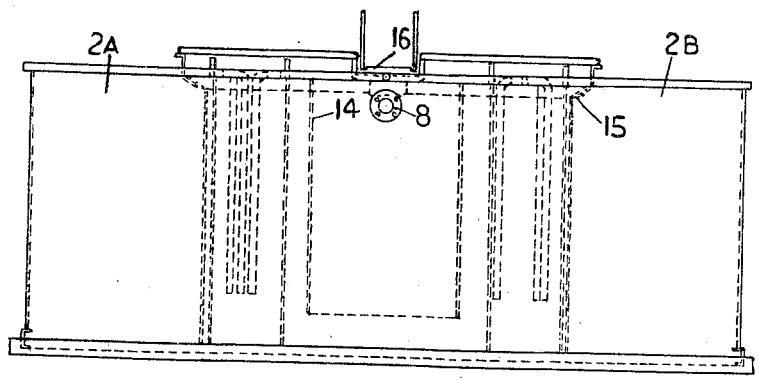

Practical embodiments of the invention are illustrated in the accompanying drawings in which FIGS. 1–4 are diagrammatic cross sections through a plant incorporating three compartments disposed side by side and FIGS. 5 and 6 are a plan and a side elevation respectively of an alternative form of plant in which the two treatment compartments and the sewage-receiving compartment surround a sludge-digesting compartment.

In the drawings and referring particularly to FIGS. 1–4, 1 denotes a sewage-receiving and aerating compartment and 2A and 2B denote treatment compartments flanking the receiving compartment 1. Means 3, 3A and 3B are provided for introducing air below the normal liquid level in the compartments 1, 2A and 2B respectively. 4 denotes fluid transfer means for transferring fluid from the compartment 2A, 5 denotes fluid transfer means for transferring fluid from the compartment 1 to the compartment 2B, 6 denotes fluid transfer means for transferring fluid from the compartment 2A to the compartment 1, and 7 denotes fluid transfer means for transferring fluid from the compartment 2B to the compartment 1. 8 denotes means for introducing sewage into the compartment 1, and 9A and 9B denote means for discharging treated sewage from the compartments 2A and 2B respectively. The means 9A and 9B may conveniently be weirs. 10 denotes fluid transfer control means controlling operation of the fluid transfer means 4, 5, 6, 7, and 11 denotes air control means operative to control the air introducing means 3, 3A and 3B, the air control means 11 being interconnected with the fluid transfer control means 10 so that the latter is operative to control the respective air introducing means according to the fluid transfer means which has been set in operation by the fluid control means.

In the embodiment illustrated in FIGS. 5 and 6 all the parts enumerated in connection with the embodiment of FIGS. 1–4 carry the same reference numerals. This embodiment contains a sludge-digesting compartment 12 surrounded by the settling compartments 2A and 2B and the sewage receiving compartment 1. 14 denotes a stilling well which is operative to receive partly settled surface fluid from the compartment 12 when the fluid level in the compartment 12 is raised by the introduction of fresh sludge from the treatment chambers 2A or 2B. The well is in connection with the sewage-receiving compartment 1 and serves to prevent agitated fluid containing sludge from being returned to the sewage-receiving compartment 1. 15 denotes splash guards for preventing splashing of fluid between the compartments 1, 2A, 2B and 12. 16 denotes a gangway for facilitating access to the compartment 12.

Figure 1:
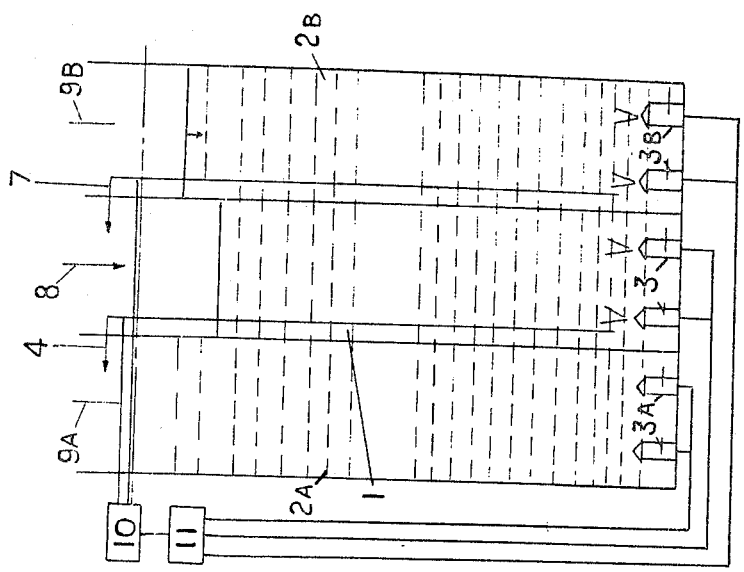
Figure 4:
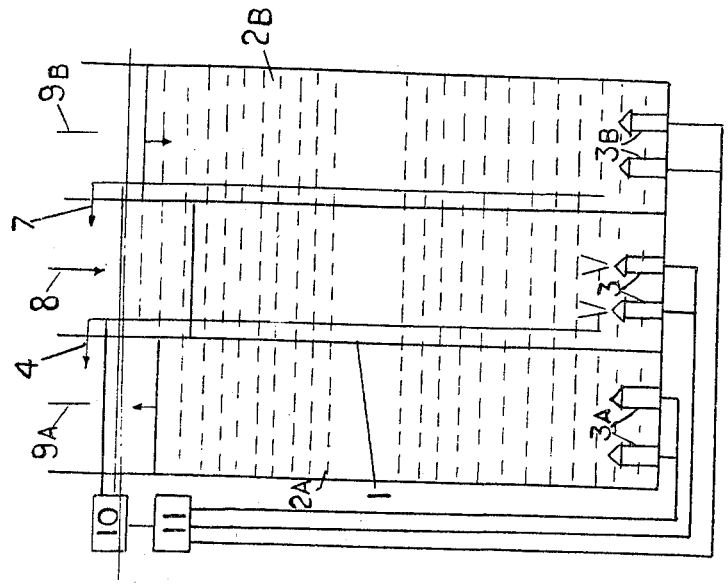
Figure 3:
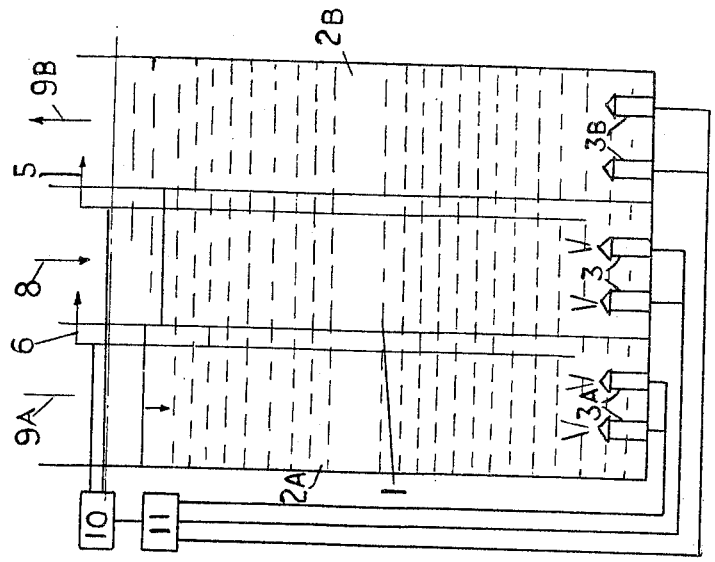

In practice, sewage is continually introduced by the means 8 into the receiving compartment 1 and is aerated there by the air introducing means 3. Aerated sewage liquor is then transferred from near the bottom of the compartment 1 into one of the treatment compartments, for example 2A, by the fluid transfer means causing its level to rise so that the surface fluid flows through the discharge means 9A and is discharged as treated effluent. At the same time sewage liquor containing sludge is being aerated in the other treatment compartment 2B by air admitted to that compartment by the air introducing means 3B and the sludge is being reactivated by the air. This reactivated sludge is transferred by the fluid transfer means 7 into the top of the receiving compartment 1 while the aerated sewage liquor already referred to is being transferred to the treatment compartment 2A. (See FIG. 1.) After a certain period the fluid transfer control means 10 operates to change the settings of the fluid transfer means 4, 5, 6, 7 to cause fluid i.e. sewage liquor to be transferred by the fluid transfer means 5 from the receiving compartment 1 into the treatment compartment 2B while fluid is now transferred by the fluid transfer means 6 into the receiving compartment 1 from the treatment compartment 2A. (See FIG. 2.) Once this fluid transfer operation is well underway air is supplied by the air introducing means 3A to the treatment compartment 2A by operation of the air control means 11 linked to the fluid transfer control means 10, while the air supply is cut off from the treatment compartment 2B. (See FIG. 3.) This action is allowed to continue until the level in the treatment compartment 2B rises to the stage where treated effluent is discharged from the surface through the discharge means 9B. After sufficient discharge has taken place from the treatment compartment 2B and when the period has been long enough to permit the sludge in the other treatment compartment 2A to become reactivated the fluid transfer control means 10 and the air control means 11 operate to change the settings of the fluid transfer means 4, 5, 6, 7 and the air introducing means 3, 3A, 3B back to the original setting. The conditions illustrated in FIG. 4 continue until the conditions illustrated in FIG. 1 are attained and the cycle described is repeated. This cycle is continuously repeated.

The sludge which settles out in each compartment 2A, 2B in turn and which has become spent is reactivated by the introduction of the air at the appropriate time to that compartment.

It will be seen that the plant according to the present invention, although receiving sludge continuously and discharging treated effluent more or less continuously, operates as a batch process. This permits individual treatment conditions to be varied during operation of the process without affecting other conditions.

In the plant illustrated in FIGS. 5 and 6 which is equipped with a sludge-digesting compartment 12 excess sludge forming in the treatment compartments 2A, 2B when the plant is operated for a long period under full load is transferred by sludge transfer means 13 to the sludge-digesting compartment 12 in which it is aerated and rendered completely inert. The fluid coming over with the sludge is returned to the receiving compartment 1 by way of the stilling well 14 to be mixed with the incoming sewage, and passes again through the plant. The inert sludge can be removed from time to time from the compartment 12 and disposed of without causing nuisance. Otherwise the plant illustrated in FIGS. 5 and 6 operates in exactly the same manner as the plant illustrated in FIGS. 1 to 4.

What is claimed is:

1. A plant for the treatment of sewage incorporating three compartments, a sewage-receiving and aerating compartment and two treatment compartments, means in each compartment for introducing air at a point below the normal liquid level in the compartment, fluid transfer means for transferring fluid between the sewage-receiving compartment and each treatment compartment, the intake of each fluid transfer means being at a lower level than its outlet, discharge means in each treatment compartment in the upper portion of the compartment for discharging treated sewage, fluid transfer control means arranged to control operation of the fluid transfer means in such manner that during operation of the plant the fluid transfer means is operative to provide alternately two settings of the fluid transfer means, one setting providing for the transfer of fluid from the receiving compartment to one of the treatment compartments and at the same time for the transfer of fluid from the other treatment compartment to the receiving compartment, and the other setting providing for the transfer of fluid to said other treatment compartment and at the same time for the transfer of fluid from said one treatment compartment to the receiving compartment, and air control means operative to control the air introducing means to admit aerating air continuously during operation of the plant to the sewage-receiving compartment but to admit air alternately to one or other selected treatment compartment, the selected treatment compartment being that in which the liquid level is dropping because of transfer of fluid to the sewage-receiving compartment by the fluid transfer means.

2. A plant as claimed in claim 1 in which the receiving compartment is arranged as a central compartment with the two treatment compartments surrounding the receiving compartment.

3. A plant as claimed in claim 1 in which the three compartments are arranged in side by side formation with the receiving compartment between the two treatment compartments.

4. A plant as claimed in claim 1 in which the means for transferring fluid from one compartment to another is airlift means.

5. A plant as claimed in claim 1 in which the discharge means from the treatment compartments are weirs over which the treated sewage flows when the level rises to the appropriate height.

6. A plant as claimed in claim 1 incorporating an extra compartment for digestion of sludge, aerating means within said compartment, and fluid transfer means connected between said sludge-digesting compartment and both treatment compartments and operable to transfer fluid from the treatment compartments to the sludge-digesting compartment.

7. A plant as claimed in claim 6 in which the sludge-digesting compartment is provided with an overflow opening leading into the sewage-receiving compartment.

References Cited
UNITED STATES PATENTS

| | | | |
|---|---|---|---|
| 2,144,386 | 1/1939 | Nordell | 210—220 X |
| 2,430,519 | 11/1947 | Mallory | 210—256 X |
| 2,901,114 | 8/1959 | Smith et al. | 210—220 X |

JAMES L. DECESARE, Primary Examiner

U.S. Cl. X.R.

210—220, 256